United States Patent [19]

Burke

[11] 4,421,323

[45] Dec. 20, 1983

[54] OIL WELL STRING MEMBER WITH STATIC SEAL

[75] Inventor: John A. Burke, Rocky River, Ohio

[73] Assignee: Greene, Tweed & Co., Inc., North Wales, Pa.

[21] Appl. No.: 413,041

[22] Filed: Aug. 30, 1982

[51] Int. Cl.³ .................. F16J 15/06; E21B 19/10
[52] U.S. Cl. .......................... 277/12; 277/30; 277/116.2; 277/117; 277/190; 285/140
[58] Field of Search ......... 277/30, 31, 116.2, 117–122, 277/116.8, 124, 190, 191, 12, 32; 138/109; 285/140, 141, 146, 147, 148

[56] References Cited

U.S. PATENT DOCUMENTS

| | | | |
|---|---|---|---|
| 2,204,586 | 6/1940 | Grau | 285/146 |
| 2,921,632 | 1/1960 | Clark | 277/116.2 |
| 3,036,639 | 5/1962 | Baker | 277/116.2 |
| 3,062,295 | 11/1962 | Hanes | 277/116.2 |
| 3,068,942 | 12/1962 | Brown | 277/116.2 X |
| 3,288,493 | 11/1966 | Brown | 285/140 X |
| 4,169,605 | 10/1979 | Nishimoto et al. | 277/188 |
| 4,304,310 | 12/1981 | Jarrett | 277/31 X |

Primary Examiner—Robert S. Ward, Jr.
Attorney, Agent, or Firm—Panitch, Schwarze, Jacobs & Nadel

[57] ABSTRACT

An oil well string member has a cylindrical outer periphery having first and second cylindrical surfaces axially spaced and connected by a tapered ramp. The surfaces are radially inwardly of the outer periphery. The first surface has a smaller diameter than the second surface. A seal assembly is provided along the first surface and arranged to respond to fluid pressure for moving the assembly across the ramp to the second surface to a sealing position.

10 Claims, 4 Drawing Figures

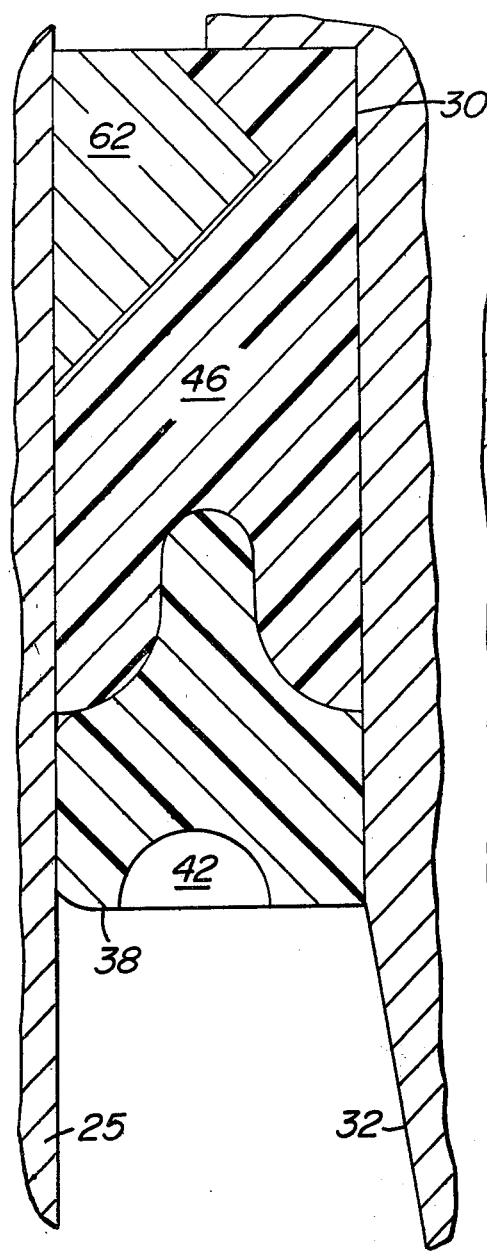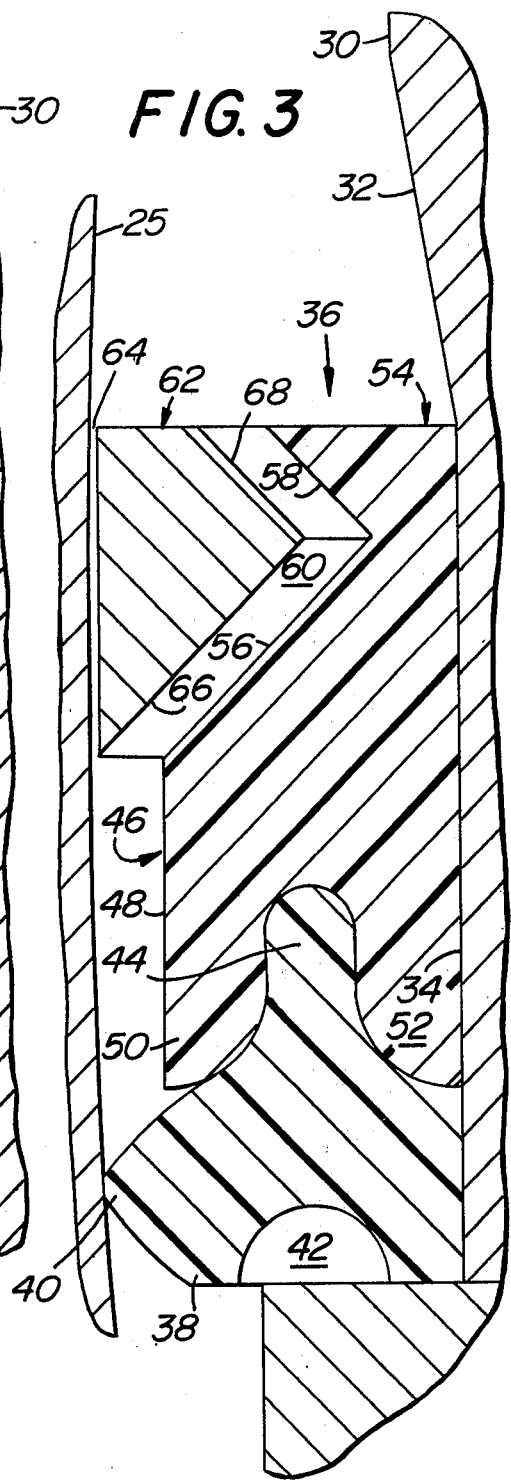

OIL WELL STRING MEMBER WITH STATIC SEAL

BACKGROUND OF THE INVENTION

After an oil or gas well has been drilled, it is necessary to introduce into the well a valve string so that the oil or gas may be removed in a controlled manner. A packer is attached to a wire line and introduced into the well. The weight of mud plus a pressure lock at the top of the well holds down the oil and gas. When the packer is installed at the bottom of the well, it includes a valve which is in a closed position. The wire line is retrieved and attached to a series of valves which are then introduced into the well. The first valve in the string is a sub-surface safety valve which is held closed by springs and well pressure. The only way to open that safety valve is to introduce a higher hydraulic pressure to override the springs and override the forces of well pressure. The safety valve must be closed when the well is swabbed.

One problem in connection with oil and gas wells is the presence of wet sour gas containing hydrogen sulfide ($H_2S$) and other corrosive fluids. $H_2S$ is a colorless gas which is extremely dangerous if inhaled since the normal tolerance is two parts per million. In addition, $H_2S$ is extremely corrosive since it forms sulfuric acid when combined with water. Hence, sealing is a severe problem. When $H_2S$ is encountered during drilling, the normal procedure is to close the well permanently or burn it off.

Another problem associated with off shore drilling is the provision of a normally 20 foot radius in the well casing which must be traversed by the valve string. When traversing the 20 foot radius, seals on the periphery of the valve string can be damaged.

Another problem in connection with deep drilling is to provide seals which can withstand the temperature and pressures involved. For example, at a depth of 15,000 feet one frequently encounters temperatures of 400° F. and pressures of 15,000 psi.

The present invention is directed to a solution of the above-mentioned sealing problems whereby a valve string may traverse a 20 foot radius in the well, will provide for controlled flow in hostile environments including $H_2S$, and has seals reliable at temperatures of 400° F. and pressures of 15,000 psi. The solution to the $H_2S$ problem will enable all previously closed wells to be activated.

SUMMARY OF THE INVENTION

The apparatus of the present invention includes a hollow member having a cylindrical outer periphery. The periphery has first and second cylindrical surfaces axially spaced and connected by a tapered ramp. The surfaces are radially inwardly of the periphery with the first surface having a smaller diameter than the second surface. A seal assembly is provided along the first surface. An end face of the assembly remote from the ramp is arranged to respond to fluid pressure for moving the assembly across the ramp to the second surface. The assembly is arranged to expand sufficiently so that a central portion of its periphery projects beyond the periphery of said member when said assembly is disposed along said second surface.

It is an object of the present invention to provide apparatus which will operate in the hostile environment of $H_2S$ with well pressures up to 22,500 psi and oil or gas temperatures to 400° F. or higher.

It is an object of the present invention to provide an oil well string member with seals which will not be damaged when traversing a 20 foot radius in a well.

It is another object of the present invention to provide a novel high pressure seal assembly.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 3 is an enlarged detailed view of the circled portion in FIG. 1.

FIG. 4 is an enlarged detailed view of the circled portion in FIG. 2.

DETAILED DESCRIPTION

Figure 1:
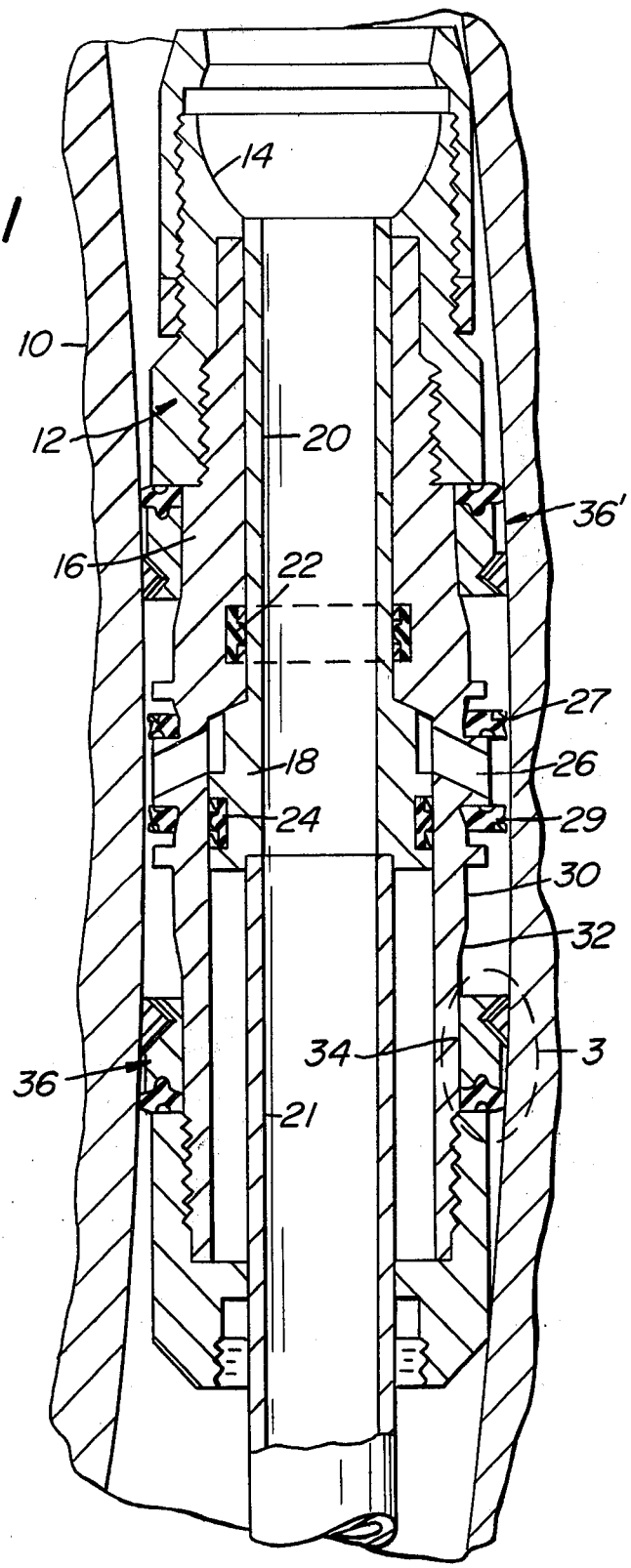
FIG. 1 is a vertical sectional view of a string member traversing an arcuate section of a well casing.

Referring to the drawing, wherein like numerals indicate like elements, there is shown in FIG. 1 a curved portion of a well casing 10 adjacent the well head. The apparatus of the present invention is designed so that it may traverse a curved portion of a well casing having a radius of about 20 feet. The present invention is also useful with well casings that do not have a curved portion. The string member of the present invention is designated generally as 12.

The string member 12 is adapted to be connected to other string members by a ball joint received with the concavity 14 at the upper end of the string member. The string member comprises a main body 16. A piston 18 is provided within the body 16. Piston 18 is hollow and has an upwardly extending hollow extension 20 and a downwardly extending hollow extension 21. Piston 18 and the extensions 20, 21 are hollow so that oil or gas may flow upwardly therethrough to ground level.

Extension 20 is sealed to the main body 16 by seal 22. The piston 18 is provided with a seal 24 in contact with the inner periphery of the main body 16. Seals 22 and 24 preferably include anti-extrusion rings. A port 26 is provided in the main body 16 so that fluid may be introduced to a reaction surface on the piston 18 and cause the extensions 20 and 21 to move downwardly when the string member 12 is at the bottom of the well. Static seals 27 and 29 are provided on the outer periphery of the string member 12 on opposite sides of the port 26.

When traveling down the well, seals 27, 29 are in the position shown in FIG. 1. When hydraulic fluid under pressure is communicated to port 26, static seals 27, 29 contain the hydraulic fluid since the seals are on opposite sides of the port 26. The seals 27, 29 are on a reduced diameter portion of body 16 and are shifted axially in opposite directions to the positions shown in FIG. 2. As the seals 27, 29 are shifted, they move along a ramp to an enlarged diameter portion and expand into contact with a portion of well packer nipple 25 shown in FIG. 2. Ramping of seals 27, 29 is similar to the ramping of seal assembly 36 described hereinafter.

Radially inwardly of its periphery, the string member 12 has axially disposed surfaces 30 and 34 on the body member 16. The surfaces 30 and 34 are spaced from one another by a tapered ramp 32. The diameter of surface 34 is less than the diameter of surface 30 by a dimenson such as 0.1 inches. Each of the surfaces 30 and 34 has an axial length sufficient to accomodate a seal assembly 36.

The seal assembly 36, as shown more clearly in FIG. 3, is comprised of a first seal element 38. The seal acts to shift the assembly 36 at the appropriate time. Further, element 38 is a molded homogenous soft rubber member which performs two functions. The first function is to act as a piston. The seal element 38 is designed so as to survive the well environment particularly in the presence of sour gas containing $H_2S$. The seal element 38 may be made from various rubber compounds but is preferably made from a fluoroelastomer characterized by regularly alternating tetrafluoroethylene and propylene units. Such material has a long term temperature resistance of 450° F., is resistant to most fluids and gases including sour gas, and has a high tensile strength up to 3100 psi. One material which can be used for seal 38 is sold commercially under the trademark "Aflas".

The seal element 38 has a feathered lip 40 on its outer periphery for line contact with the inner surface of the well casing 10. On its inner surface, the seal element 38 is in planar contact with surface 34. On its high pressure side, the seal element 38 has a cavity 42 axially disposed with respect to an upwardly extending projection 44 having a rounded nose.

The second seal element of the assembly 36 is designated 46. The seal element 46 has an axially extended outer peripheral surface 48 spaced for substantial clearance from the inner surface of the well casing 10. The seal element 46 has a pair of lips 50 and 52 which embrace the projection 44. On its entire inner peripheral surface, seal element 46 is in loose contact with surface 34.

The seal element 46 has a heel portion 54 defined by converging surfaces 56 and 58 which converge radially inwardly and have an included angle of about 90°. Surface 58 is shorter in length than surface 56. Seal element 46 is preferably made from polytetrafluoroethylene having a 30% fiberglass load.

The third seal element of the assembly 36 is a zero clearance ring 62 made of a metal which is noncorrosive with respect to sour gas. The ring 62 floats freely on the heel 54 and is spaced therefrom by the gap 60. Ring 62 has a slight clearance gap 64 between its outer periphery and the inner periphery of the well casing 10. Ring 62 has converging surfaces 66 and 68 on its inner periphery for mating with the surfaces 56, 58 respectively when the heel 54 is expanded. Surfaces 56, 58 cooperate with surfaces 66, 68 to prevent axial separation of seal elements 46, 62 while traversing to the bottom of the well. Ring 62 prevents cold flow of the second seal element 46. Due to the difference in lengths of the surfaces 58, 60 and 66, 68, the axial force of fluid pressure applied to the first seal element 38 will exceed any radial force and thereby prevent extrusion or cold flow of the second seal element 46.

The seal assembly 36 is designed so as to be responsive to well pressure when the safety valve is opened by hydraulic pressure. The seal assembly has been tested and has withstood differential pressures up to 22,500 psi while being bubble tight so as to have zero leakage. The seal assembly was found to be safe at 25,000 psi for six cycles with no leakage.

Figure 2:
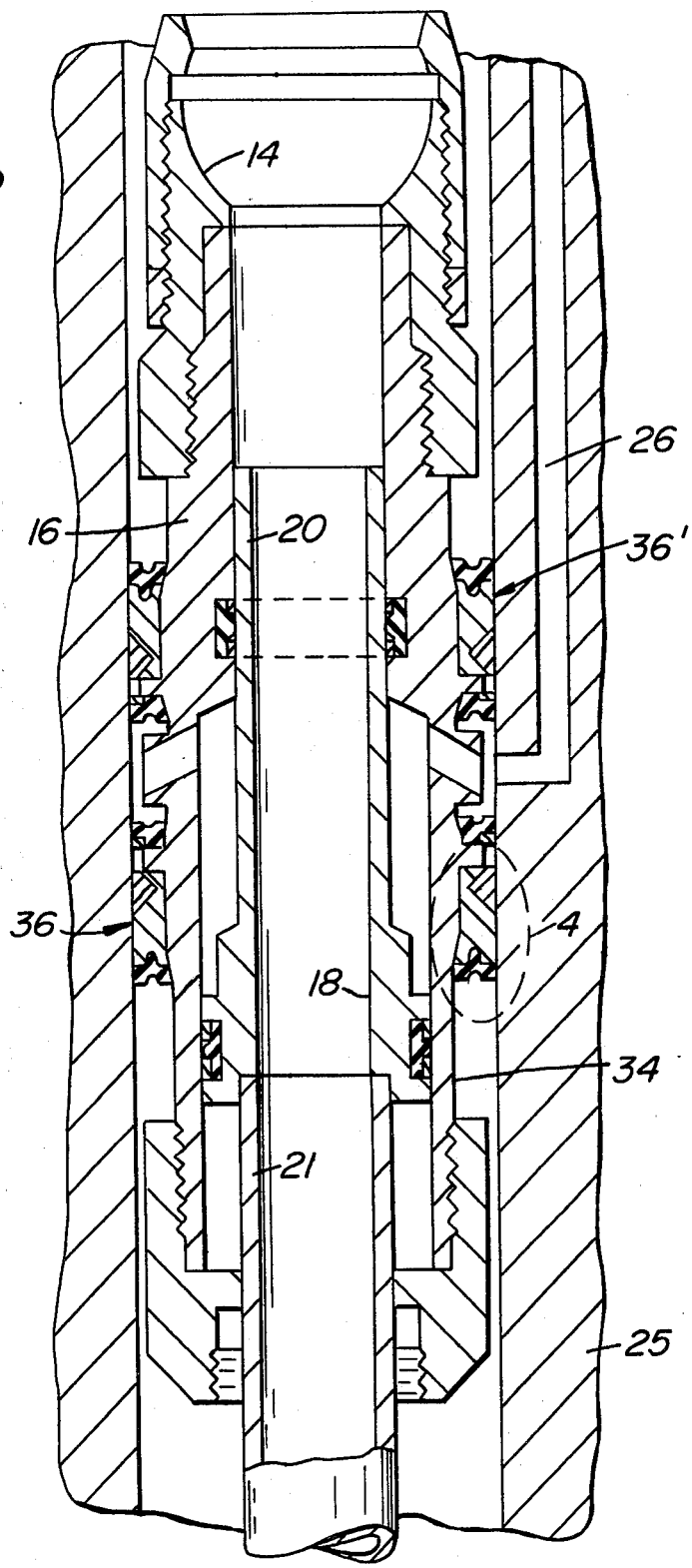
FIG. 2 is a view similar to FIG. 1 but showing the string adjacent the packer nipple at the bottom of the well.

The string member 12 is adapted to traverse curved portions of the well casing as shown in FIG. 1. When in place at the bottom of the well as shown in FIG. 2, hydraulic fluid is introduced downwardly from ground level through packer nipple 25 to the port 26 to shift the piston 18 downwardly and to cause seals 27, 29 to shift as described above. When the piston 18 is shifted downwardly, it opens the safety valve at the bottom of the well. The gas and/or oil travels upwardly through the hollow string member 16, and other string members attached to it to ground level. At the same time, seal element 38 is exposed to well pressure. Due to the material from which it is made, the seal element 38 can withstand exposure to $H_2S$. In response to the well pressure on the end face of seal element 38, the seal assembly 36 shifts from the portion shown in FIG. 3 to the position shown in FIG. 4.

When shifting from the position shown in FIG. 3 to the position shown in FIG. 4, the assembly 36 moves up the ramp 32, onto the surface 30. In doing so, the seal element 38 is expanded as is shown in FIG. 4, surface 48 of seal element 46 moving radially outward 0.04 to 0.06 inches and contacting the inner surface of the well packer nipple 25. Surface 48 constitutes the primary high pressure seal. In addition, the heel 54 deformed radially outwardly into contact with the third seal element 62 so that surface 56 contacts surface 66 and surface 58 contacts surface 68. Once ramped, as shown in FIG. 4, the assembly 36 does not move and cannot be reused. It is a long term seal for the life of the well.

The present invention can be used in other environments in addition to oil and gas wells. Thus, the present invention could be used in high pressure vehicle suspension systems or high pressure shock absorbers. The invention solves the problem of high pressures sealing without requiring close tolerances since the seal assembly can be installed with a loose fit and expanded in situ when exposed to high pressure.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising a member having a cylindrical outer periphery, said outer periphery having first and second cylindrical surfaces axially spaced and connected by a tapered ramp, said surfaces being radially inwardly of said periphery with said first surface having a smaller diameter than said second surface, a seal assembly along said first surface, an end face of said assembly remote from said ramp being arranged to respond to fluid pressure for moving the assembly across the ramp to the second surface, said assembly being arranged to expand in a radially outward direction as it moves across the ramp so that a central portion of its periphery projects beyond the periphery of said member when said assembly is disposed along said second surface.

2. Apparatus in accordance with claim 1 wherein said assembly includes a first sealing element of resilient material at said end face and having a peripheral sealing lip, said end face being recessed, a second sealing element of polymeric material, said second sealing element having a surface adapted to be moved radially outwardly by contact with said first sealing element, and a third sealing element of metal floating on a heel of said second sealing element, said heel and said third element having mating angled surfaces spaced from each other in the absence of pressure and adapted to be in contact when said heel has been expanded radially outwardly due to movement across the ramp.

3. Apparatus in accordance with claim 1 wherein said member is hollow and slideably supports therein a hollow piston which forms a flow passage through said member.

4. A high pressure seal assembly for installation with a loose fit and subsequent expansion in situ comprising;
   (a) a first annular sealing element of resilient material having a peripheral sealing lip, one axial face of said sealing element being intended to be exposed to high pressure and being recessed, and an axial projection on the other axial face of said first sealing element,
   (b) a second sealing element of polymeric material, said second sealing element having a lip adapted to be forced outward by said first element, said projection being received by said second element in a manner so that the projection may cause the second element to move axially,
   (c) a third sealing element of metal floating on a heel of said second element, said heel and said third element having mating angled surfaces spaced from each other in the absence of pressure and adapted to be in contact when said heel has been expanded in a radial direction into contact with said third element.

5. A seal assembly in accordance with claim 4 wherein the angled surfaces on said heel and third element which are closer to said projection being longer than the other of said mating surfaces.

6. A seal assembly in accordance with claim 4 wherein said first seal element is made from an elastomer which resists $H_2S$, said second sealing element being made from polytetrafluoroethylene, and said third sealing element being made from metal which is noncorrosive with respect to $H_2S$.

7. A seal assembly in accordance with claim 4 wherein the outer diameter of said third element exceeds the outer diameter of said second element by a distance corresponding to the radial length of said space between the heel and said third element.

8. An oil or gas well string member having static seals on its outer periphery and arranged so as not to be damaged during downward passage through an arcuate portion of a well casing, said member having first and second cylindrical surfaces axially spaced and connected together by a tapered ramp, said surfaces being radially inwardly of the periphery of said string member, said first surface being below and having a smaller diameter than said second surface, a seal assembly along said first surface, said seal assembly being arranged to respond to fluid pressure from below for moving the assembly upwardly across the ramp to the second surface, said assembly being arranged to expand sufficiently so that a central portion of its periphery will project sufficiently radially outwardly for contact with a portion of a well when the assembly is on said second surface, said assembly including a first annular sealing element of resilient material resistant to $H_2S$, a second sealing element above said first sealing element and in contact therewith, said second sealing element being made from a polymeric plastic material, the upper end of said second sealing element being of reduced diameter and defined by conical surfaces converging inwardly, and a third sealing element of metal resistant to $H_2S$, said third sealing element surrounding said converging surfaces and spaced therefrom, said third sealing element having radially inwardly converging surfaces on its inner periphery, and said converging surfaces of said third sealing element being adapted to mate with said conical surfaces on said second sealing element.

9. A string member in accordance with claim 8 including a port in said string member between said static seals, a hollow piston supported by said member with a reaction surface on the piston exposed to said port so that fluid from said port can move the piston downwardly and can move the static seals axially in opposite directions, means on said member for causing said static seals to expand as they move axially.

10. An oil or gas well string member having first and second cylindrical surfaces axially spaced and connected together by a tapered ramp, said surfaces being radially inwardly of the periphery of said string member, said first surface having a smaller diameter than said second surface, a seal assembly along said first surface, said seal assembly being arranged to respond to fluid pressure for moving the assembly as a unit from the first surface across the ramp to the second surface, said assembly being arranged to expand sufficiently in a radial direction so that a central portion of its periphery will project sufficiently radially outwardly for contact with a portion of a well when the assembly is on said second surface, said assembly including a first annular sealing element of resilient material resistant to $H_2S$, said assembly including a second sealing element in contact with said first sealing element and being made from a polymeric plastic material, said assembly including a third sealing element surrounding said second sealing element and being arranged to prevent extrusion and cold flow of the second sealing element, said string member being hollow so that oil or gas may flow therethrough, and means on at least one end of said string member for securing said string member to another string member.

* * * * *